US010282468B2

United States Patent
Kim et al.

(10) Patent No.: US 10,282,468 B2
(45) Date of Patent: May 7, 2019

(54) DOCUMENT-BASED REQUIREMENT IDENTIFICATION AND EXTRACTION

(71) Applicant: International Business Machines Corporation, Armonk, NY (US)

(72) Inventors: Hyun-Woo Kim, San Jose, CA (US); Hamid R. Motahari Nezhad, San Jose, CA (US); Taiga Nakamura, Santa Clara, CA (US); Mu Qiao, Belmont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 14/932,999

(22) Filed: Nov. 5, 2015

(65) Prior Publication Data

US 2017/0132203 A1 May 11, 2017

(51) Int. Cl.
*G06F 17/00* (2006.01)
*G06F 17/30* (2006.01)
*G06F 17/27* (2006.01)

(52) U.S. Cl.
CPC .... *G06F 17/30705* (2013.01); *G06F 17/2765* (2013.01)

(58) Field of Classification Search
CPC ...... G06F 17/2705; G06F 17/20; G06F 17/17; G06F 17/18; G06F 17/30; G06F 17/30401; G06F 17/30684; G06F 17/30011; G06F 17/2247; G06N 99/005
USPC ................................................. 715/234, 200
See application file for complete search history.

(56) References Cited

U.S. PATENT DOCUMENTS

| | | | |
|---|---|---|---|
| 9,122,673 B2 * | 9/2015 | Alshinnawi | G06F 17/2795 |
| 9,286,379 B2 * | 3/2016 | Yang | G06F 17/30707 |
| 9,342,489 B2 * | 5/2016 | Sethu | G06F 17/2211 |
| 2001/0027488 A1 * | 10/2001 | Hodgkin | G06F 17/30014 |
| | | | 709/229 |
| 2002/0031260 A1 * | 3/2002 | Thawonmas | G06F 17/30616 |
| | | | 382/190 |

(Continued)

OTHER PUBLICATIONS

Internet Society RFCs et al., "Requirements for Internet-Draft Tracking by the IETF Community in the Datatracker," IP.com, IP.com No. 000208091, Publication Date: Nov. 30, 2011, 35 pages.

(Continued)

*Primary Examiner* — Manglesh M Patel
(74) *Attorney, Agent, or Firm* — Cantor Colburn LLP; Abdy Rassinia

(57) ABSTRACT

According to an aspect, document-based requirement identification and extraction includes parsing a set of documents and identifying relationships among parsed components of the documents and applying the parsed components and identified relationships to a meta-model that defines requirements. The requirements include a statement expressing a need and/or responsibility. A further aspect includes identifying candidate requirements and their candidate topics from results of the applying. For each of the identified candidate topics, a feature vector is built from the corresponding candidate requirements. A further aspect includes training the meta-model with the feature vectors, validating the meta-model, and classifying output of the validating to identify a subset of the candidate requirements, and corresponding topics expressed in the set of documents.

17 Claims, 5 Drawing Sheets

(56) References Cited

U.S. PATENT DOCUMENTS

| | | | |
|---|---|---|---|
| 2005/0086253 A1* | 4/2005 | Brueckner | G06F 17/30713 |
| 2007/0211964 A1* | 9/2007 | Agam | G06K 9/00161 |
| | | | 382/305 |
| 2008/0288292 A1* | 11/2008 | Bi | G06Q 50/24 |
| | | | 705/3 |
| 2009/0076928 A1 | 3/2009 | Hjertonsson et al. | |
| 2012/0041769 A1* | 2/2012 | Dalal | G06Q 10/101 |
| | | | 705/1.1 |
| 2013/0159346 A1 | 6/2013 | Kasravi et al. | |
| 2015/0066939 A1* | 3/2015 | Misra | G06F 17/3071 |
| | | | 707/739 |
| 2016/0337295 A1* | 11/2016 | Bennett | H04L 51/18 |
| 2017/0103441 A1* | 4/2017 | Kolb | G06Q 30/0627 |

OTHER PUBLICATIONS

Disclosed Anoymously, "RFP Response Content Management System," IP.com, IP.com No. 000228901, Publication Date: Jul. 11, 2013; 8 pages.

James W. Hill, "The proper structuring and use of strategies, outlines and theme statements for technical proposals," IEEE Professional Communication Society; AN-2906944; 1986, 6 pages.

* cited by examiner

DOCUMENT-BASED REQUIREMENT IDENTIFICATION AND EXTRACTION

BACKGROUND

The present disclosure relates generally to information management, and more specifically, to document-based requirement identification and extraction.

Request for proposal (RFP) documents describe a client's business and service requirements in natural language. For large businesses, RFP packages oftentimes consist of tens to hundreds of documents and are created in a variety of formats and structures. In addition, these packages often contain complex terms and use diverse vocabularies. Thus, processing RFPs manually can be slow, tedious, and error prone.

SUMMARY

Embodiments include a method, system, and computer program product for document-based requirement identification and extraction. A method includes parsing a set of documents, identifying relationships among parsed components of the documents, and applying the parsed components and identified relationships to a meta-model that defines requirements. The requirements include at least one statement expressing at least one of a need and/or a responsibility. The method also includes identifying candidate requirements and their candidate topics from results of the applying. For each of the identified candidate topics, the method includes building a feature vector from the corresponding candidate requirements. The method further includes training the meta-model with the feature vectors, validating the meta-model, and classifying output of the validating to identify a subset of the candidate requirements, and corresponding topics expressed in the set of documents.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein provide document-based requirement identification and extraction. While the embodiments are described with respect to Request for Proposal (RFP) documents, it will be understood that the embodiments can be extended to any types of documents that contain requirements. The term "requirement" is used herein to describe a statement of need, ask, or responsibility.

Embodiments provide automated identification of client services' (e.g., information technology (IT) services) requirements from RFP documents. The automated identification includes analyzing textual statements contained in the documents, and determining which statements together constitute a requirement, and the nature or type of requirement. An entity seeking services from another entity via a RFP is referred to herein as a client.

Embodiments also include identifying a set of provider services that meet the client business requirements. This identification extends across different vocabularies. An entity that provides services requested by a client in a RFP is referred to herein as a service provider. Further embodiments include extracting instructions and guiding principles that govern bidding processes including deadlines, milestones, and a response format including questions that the client may want answered in a response to the RFP.

The document-based requirement identification and extraction processes provide a cognitive solution that employs linguistic-based and machine learning methods for automated processing of RFP documents for extracting requirement statements, and mapping them to offering taxonomies. The document-based requirement identification and extraction processes further provide a set of linguistic-based methods combined with machine learning, and an interactive tool that enables continuous learning and improvement of the methods by incorporating users' feedback on the outputs of the tool.

The techniques described herein can be easily modified for application to contract documents among service providers and clients to identify agreed-upon service requirements and scope of services among the participants.

Figure 1:
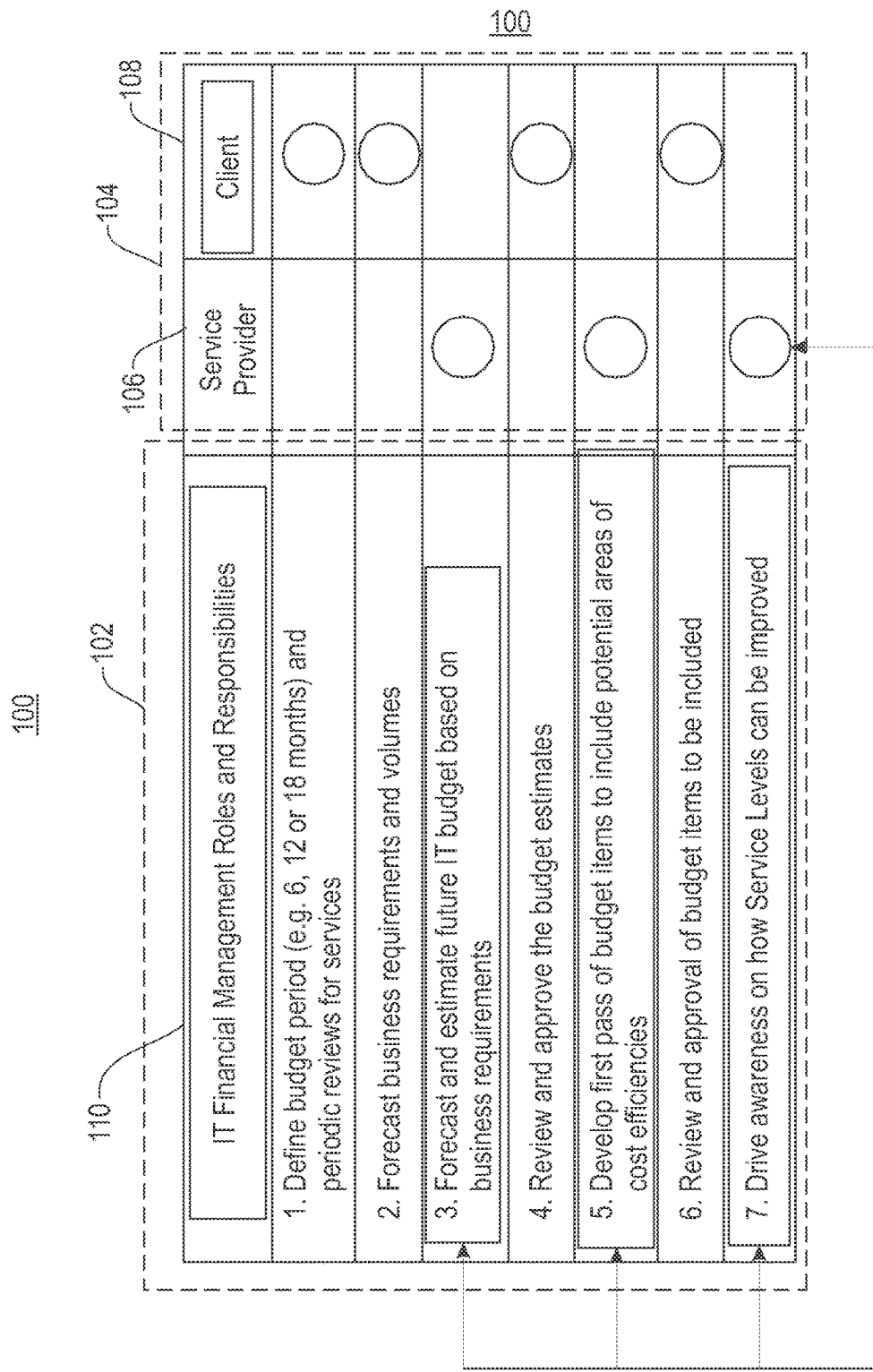
FIG. 1 depicts a requirement statement in the form of a table.

As indicated above, oftentimes RFP packages are not presented in an easy-to-understand format. For example, in some cases, features may be missing from a statement. In other cases, the same features may be presented in several sentences next to each other or may be presented apart from one another in different documents. Further, the features may not be presented in text only format. For example, as shown in FIG. 1, a requirement statement 100 in the form of a table is shown. The requirement statement 100 may form part of an RFP. As can be seen in the statement 100, requirements are expressed in both text form 102, as well as in non-text form 104, where different features can be found in different columns and rows of the table. As shown in FIG. 1, features indicated in one column 106, in conjunction with rows numbered 3, 5, and 7 of the table 100, include requirement features corresponding to a service provider (shown by arrows). Features indicated in another column 108, in conjunction with rows numbered 1, 2, 4, and 6 of the table 100, include requirement features corresponding to a client. As will be described further herein, a title 110 of the statement 100 may be identified as a potential topic. Thus, understanding a requirement that is expressed in different formats can be challenging.

Aside from the above issues, it is also possible that some requirements contain sub-requirements, each of which sub-requirements providing more detail on the corresponding parent. Identifying these relationships is important in order to accurately identify requirements.

In addition to the above-noted challenges, it is also difficult to identify mappings of identified requirements to the internal service offerings of the service provider. Service providers usually maintain a catalog of service offerings that are often in form of a hierarchy of offerings, referred to as a service taxonomy. Nevertheless, the client service needs may not be expressed using the same vocabulary found in a particular service provider's taxonomy. Using the above-referenced IT example, the embodiments described herein identify the mapping of a client's requirements to (e.g., ITIL (Information Technology Infrastructure Library)) directly, and extract client service vocabulary and taxonomies from the RFP documents to provide also a mapping of requirements to those two representations.

Figure 2:
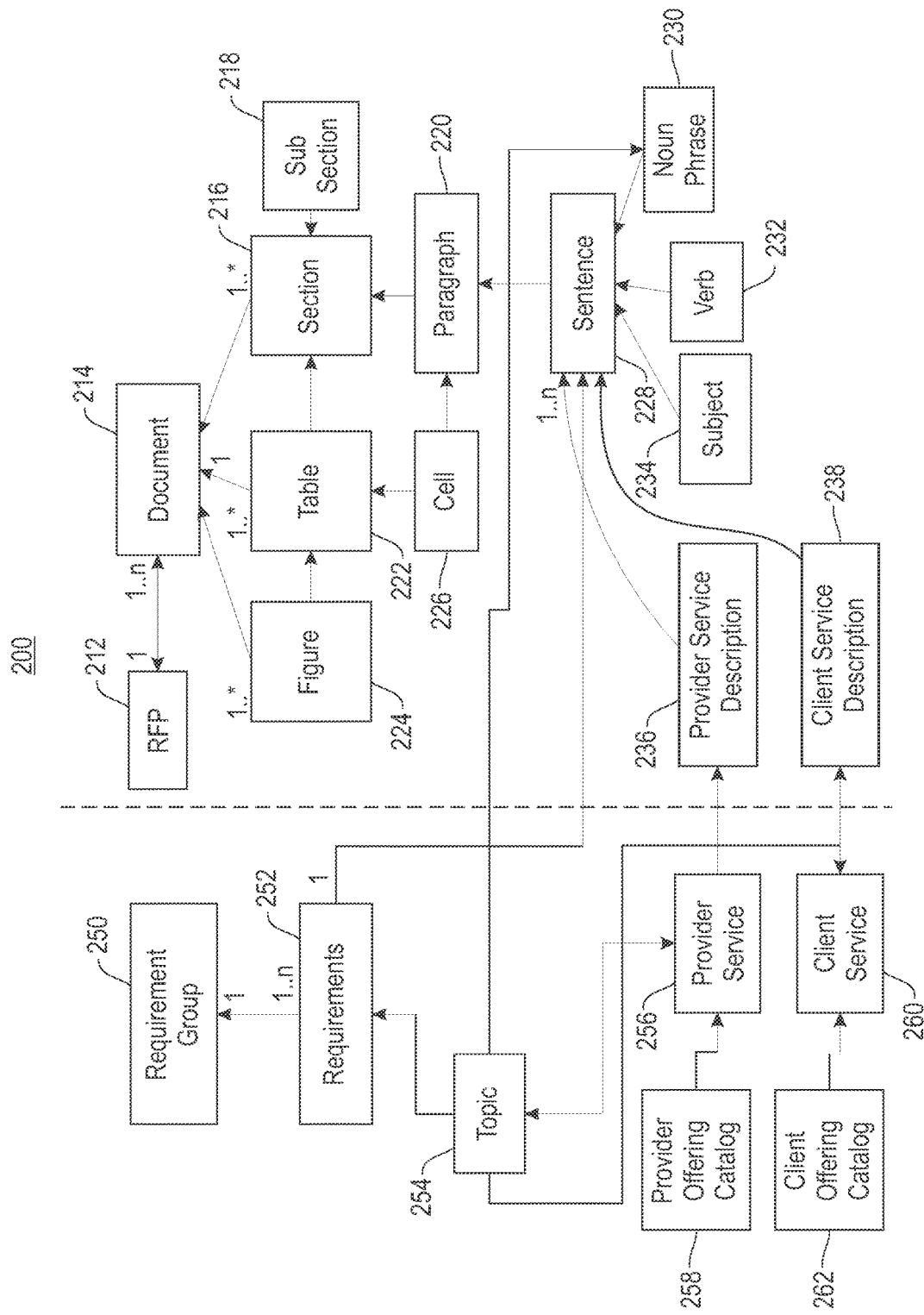
FIG. 2 depicts a requirements metadata model in accordance with an embodiment.

Turning now to FIG. 2, a meta-model 200 for service requirements that can be used in implementing the document-based requirement identification and extraction processes will now be described. The meta-model 200 describes the conceptual elements of RFP documents including structural elements in a given RFP document or attachment. As shown in FIG. 2, an RFP 212 may consist of one or more documents 214, each one containing one or more sections 216 with associated subsections 218, paragraphs 220, tables 222, FIG. 224, cells 226, sentences 228, etc. There may be also references from the text within one section of an RFP document to other parts within the same document or another part within another document of the RFP.

Meta-model 200 shows the conceptual elements that represent requirements 252 and requirement group 250 as a set of individual requirements, which create parent/child relationship among requirements. A requirement may have one or more topics 254, and may be associated to a given offering element 256 in the provider offering taxonomy 258, and one or more offering needs 260 in the client taxonomy 262. Without loss of generality, the set of attributes defined for each concept shown in FIG. 2 are representative attributes of each concept.

Also, as shown in FIG. 2, a requirement 252 may be mapped to one or more sentences 228 in a document 214. The sentence 228 is parsed into subject 234, verb 232, and noun phrase 230. In an embodiment, a requirement's 252 responsible party may be mapped to the subject 234 of the sentence 228. The mapping process takes, as one parameter, the similarity matching of the set of sentences mapping a requirement to the sentences forming the service description for providers 236 and client's service description text 238 (e.g., a number of sentences). These, and other features, are described further herein.

A requirement may consist of at least the following features: <responsible party, verb phrase, responsibility topic>, and a number of additional features such as <SLA, Location, Time, Related Entity, Parent>. One or more client requirements may be linked to one or more service offerings on the service provider side (many-to-many relationships). Examples of service offerings are services defined (at various level of granularity) in ITIL service taxonomy, service provider's taxonomy, and client's service taxonomy. The elements left of the dotted line in FIG. 2 show high level relationships among modeling elements as described herein.

The elements to the right of the dotted line in FIG. 2 illustrate basic elements in RFP documents (elements such as section, paragraph, sentence, figure, table, references, etc. and how they are linked to the requirement model defined above. In particular, a requirement 252 is associated to one or more statements (sentences) 228 in RFP documents 214. The document-based requirement identification and extraction processes use information obtained from processing the structure of information to identify which statements (sentences) 228 are requirements 252, and which set of them belong to the same requirement.

Figure 3:
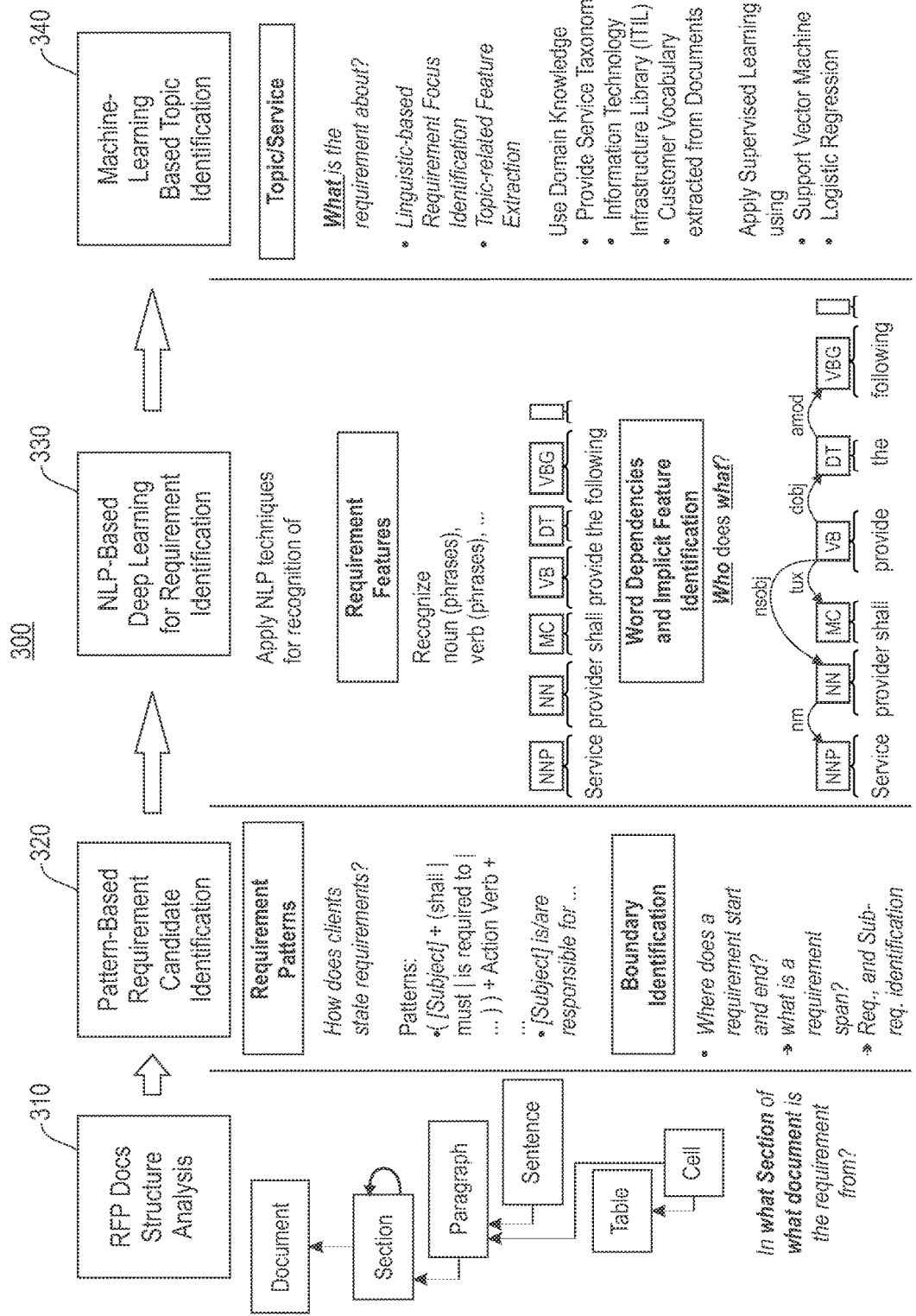
FIG. 3 depicts a high-level flow diagram for requirement information extraction from RFP documents in accordance with an embodiment.

In an embodiment, a requirement identification framework 300 includes four process elements, as depicted in FIG. 3. In element 310, the set of RFP documents is analyzed to identify the relationships among different components in the documents starting from the sentence level, to paragraph level, section level (including all text, figure and table in the section), document level, and also cross-document level. At the cross document level, all sections and text that are cross-referenced are linked together to build a holistic, connected model of all documents in the RFP package. In a training step, the section information is gathered to build a model of section titles that frequently contain requirements, such as "Statement of Work" sections. This information is used as one parameter to assess the likelihood a statement is a requirement.

In element 320, first the part of speech recognition (POS) tags of statements in the text may be identified by applying standard natural language processing (NLP) POS tagger methods. A number of rules may be applied that specify how the requirements are often expressed by the client, and look for the features that constitute a requirement as per the requirement model, as discussed above. Also, once a requirement candidate is identified, all text following the requirement is considered related to the current requirement until a next requirement statement is found. All the text that are related to a given candidate requirement are processed for finding potential sub-requirements.

In element 330, the candidate requirements that are found in response to element 320 are inspected and processed along with metadata and contextual information to compute a confidence score for each requirement based on the assessment of the values of features found for the candidate requirement, section and context where the statement is located in, the word dependencies and any dependencies among the sentences with the span of a requirement.

In element 340, for each identified candidate, the main topic or the service that the requirement is focusing on is identified. This is particularly useful as one of the goals is to find the main services, and related requirements to those services, that are mentioned within the RFP.

Element 320 will now be described in greater detail according to an embodiment. A purpose of requirement candidate identification is to prepare an initial set of candidate requirement statements for further, more detailed and deep analysis for requirement analysis through a light and fast process. The requirement identification approach consists of a high level, abstract model for requirement candidate identification consisting of the following three elements:

Explicit requirement Pattern. An explicit requirement pattern refers to a requirement statement where the subject (responsible party) is explicitly defined. It follows the following structure: <subject> <verb> <object>. The attributes do not need to be in this order in the statement. Examples of most common statements complying with above pattern include: The service provider will supply X, Y, Z; Z, Y, Z has to be supplied by <Name>/provider.

In order to recognize such patterns, linguistic-based rules may be applied that include patterns in the form of <subject: service provider> <auxiliary: will, should>+<requirement action verb: e.g., "Is responsible for," provides, passive action verbs, present tense verbs (whether it is an "ask")>. The above rules operate on part of speech tags and a vocabulary list for the subject and the responsibility verbs. Any synonyms of those keywords and verbs may also be allowed under these rules.

Implicit Requirement Pattern. Not all parts of the necessary features in the requirement data model may be present in the statement. For example, in many cases, the subject is not present and the sentence starts with a verb, for instance: "Provide X, Y, Z." This is the typical case for a bulleted list. The responsibility is determined by the context (generally a reference to the responsible party within the preceding paragraph).

Structure-based Requirement Pattern. In some cases, the main features of a requirement may not appear all together within a document and structural clues may be used to enable one to identify the start of a requirement. One example is under a given heading, there is no sentence but a list of items, which are presumed as responsibilities of the service provider. The section title may have keywords referring to Responsibilities or in contrary cases to exclusions from the responsibility, which should be understood as such.

To process the content of RFP documents, explicit structure-based requirements are identified followed by implicit and structure-based requirements. The same principle applies when processing list items within a list. Tables have their own set of patterns to identify feature values related to requirements. For both lists and tables, the paragraph (or section title, if no text before) that precedes the list or the table is searched for contextual information on the responsibility clues, exclusions or missing feature value (such as a subject).

Deep Analysis and Learning for Requirement Identification.

Element 330 of FIG. 3 will now be described in further detail. This process focuses on deep analysis of each candidate requirement to assess the evidences that are found related to each candidate, and makes a final decision. An evidence refers to a feature defined in the requirement and the assessment of the strength of the score of the feature in determining whether a candidate requirement is an actual requirement. The candidate identification step acts as a filter which reduces the space of possible candidate sentences and statements from the RFP documents that should be examined for requirements. Each evidence is assessed based on an evidences score that is assigned to the strength of information that is found to identify whether the information belongs to key features of a requirement, i.e., subject (responsible party), verb (responsibility definition), and object (the topic or service).

Responsibility Evidence Assessment. The extracted responsibility evidences are re-evaluated in their context. In particular, the following elements are among the supporting evidences that may be looked for:

(i) Signals, which include various forms of responsibility expressions, deliverable definitions, and dependencies are analyzed; and (ii) The following rules may be checked regarding the responsibility signals:

(1) Signal is head of NP (noun phrase) and SP (service provider)/client is within the NP;

(2) Signal is head of NP and SP/client is right before NP; and (3) Signal is head of NP, with NP being part of a conjunction and SP/client a conjunct.

The above rules lead to the identification of the following form of responsibility definition: "following"+<responsibility signal>; for example, in statements such as "provider's responsibilities include the following." Also, alternative patterns may be used: <responsibility signal>+"following." For instance, "the following responsibilities being managed and fulfilled by the client." There are other synonym words that also signify a responsibility definition, such as "upcoming," "following," "below" "as follows," "including," "includes," "described as under," "described under," "such as," and "include."

The evidences above contribute to defining a score between 0-1 (shown, e.g., in block 414 of FIG. 4 and described further herein), which shows the confidence that a responsible party is defined. The guideline for assigning the score provides that whenever the signals are present within the requirement statement, it gets the highest score, and as the signal weakens or is mentioned further away from the statement (in terms of number of tokens), the scores gets proportionately lower.

Another other aspect of a responsibility is identifying whose responsibilities are being defined. In some cases, there are explicit mentions of "Service provider" or the "Client," and in other cases neither is mentioned, in which case contextual information, such signals in preceding sentences, paragraphs and the section title, can be relied on. Based on the above, a confidence score (e.g., between 0-1) is defined considering the explicit mention of one of the parties resulting in a higher score, or an implicit mention resulting in a lower score, and a lower score may be assigned as the signal gets weaker.

Responsibility Verb Evidence Assessment. All signal evidences that are collected for each candidate may be assessed in order to assign an evidence confidence score. In particular, the verbs are validated based on whether they define valid asks, requests or needs. In an embodiment, main keywords (and their synonyms) that may be looked for include: "provide," "is responsible for," "obligated," "should offer," "will perform," and "will supply," among others. Apart from the vocabulary of the verbs, the type of the verb (e.g., whether it is an action verb phrase), the tense of the verb (e.g., with respect to the responsible party) and its dependencies may also be checked to ensure that the topic/service, as described below, or the responsible parties are dependent to the given verb. The combination of the above signals, including whether auxiliary verbs are present, and the statistical frequency of verbs in actual requirements (or their synonym similarity) lead to the assignment of a score between 0-1 as the responsible verb confidence score.

Topic evidence assessment. Another component of the requirement identification is determining what the statement is about, and whether it is focused on one or more services that are in any of the service taxonomies in the repository. In requirement identification, the similarity between noun phrases in the requirement statement and any service element name in the service provider taxonomy, ITIL service taxonomy, or client service taxonomy is assessed, and the highest similarity score (between 0 . . . 1) is taken as the confidence score of the topic evidences.

The final method for requirement identification defines a weighted function over these three evidence as follows: $\Sigma w_i f_i$, i=1 . . . 3, and $\Sigma w_i$=1. Initially, the weights may be set for the three features to be equal to 0.33. In an embodiment, an adaptive learning module takes the feedback of the users in a batch processing mode and adjusts each of the weights, adopting a promotion and demotion method, such as Winnow algorithm.

Requirement Score Interpretation and Real-World Field Study. The above procedure leads to a confidence score between 0 . . . 1 for each requirement. In an embodiment, the user is able to set a configuration parameter to view requirements with varying confidence scores (e.g., very high confidence, high confidence, average confidence, and low confidence).

Requirement Topic and Focus Identification.

One purpose of topic and focus identification for a given requirement is to determine the particular service, and aspect of that service, specified by the requirement. This information enables the grouping and presentation of the requirements to the user in an effective manner. In an embodiment, a topic is a noun phrase in a requirement that depends on the responsibility verb, and matches one or more service-related vocabulary in the service catalogs. A given requirement may have one or more topics (e.g., noun phrases depending from or associated with the responsibility verb, and qualifying matching criteria). The focus of a requirement is the topic that is directed to the main purpose of the sentence, which is the main topic associated to the responsibility verb, which also can be known as the "object" of the sentence in linguistic terms. It should be noted that in NLP literature, there are multiple definitions for topic (theme) and focus (comment, rheme) of a sentence, which is specified following a number of rules on the syntax and semantic of the sentence, and is different but related, to the notion of topic and focus in this paper.

One other difference with the linguistic interpretation of the focus is that the focus of a requirement may be found outside of a given requirement. This is the case for requirements with explicitly missing, and implicitly inferred, topics and focus. Example of places that the missing topic phases can be found include a paragraph containing the requirement, a section title, a table caption, and a heading-sentence's topic of a list.

Topic and focus identification of a requirement may be implemented using machine learning techniques. In an embodiment, a number of features are extracted for all noun phrases in the requirement. These features include structural and linguistic features of the requirement to enable the process to find the structural dependencies between three main parts of a requirement model (subject, verb, and topic). In particular, dependencies for a subject (implicit, or explicit) may be determined by assessing whether the subject is explicitly present, whether the subject contains a possessive form, the number of noun phrases, the order of the particular noun phrases in the sentence (e.g., the given noun phrase is the Nth noun phrase in the sentence), the order of the noun phrases as Mth token in the sentence, whether the noun phrase is a part of a predicate, the level in the sentence's parse tree (e.g., the number of hops from the parse tree's root node), the distance to the dependent responsibility verb, and the highest Jaccard similarity score for the match with service and provider/client catalog vocabulary including the ITIL taxonomy. As part of the features, the process may also consider whether the dependency on the responsibility verb is direct or indirect (e.g., through intermediates).

A classifier is then trained to identify the main topic (the focus) of the requirement from the list of candidates. In a situation in which the topics (and focus) are not present in the body of the requirements (e.g., when the object noun phrase (or any subset of it)) does not match any phrase in the service catalogs, the topics and focus identified in the surrounding context, as mentioned above, may be relied on. The surrounding context is followed in a hierarchical manner from sub-requirements to requirements, paragraph/table/list, sections, and all RFP documents in search of the focus. The topic of other higher level contexts can be identified using the same machine learning approach with different feature sets. The matching to service-related concepts and catalogs includes two types: 1) matching to service element names in one of service catalogs, e.g., "Mainframe Infrastructure Management;" or 2) matching one or more of vocabulary related to service offerings such as "SLA," "service location," etc.

Requirement to Offering Mapping.

Once the requirements are identified, the process then identifies which requirement is related to which service elements in the offering taxonomies and catalogs. This can be particularly useful for understanding which offerings are within the scope for putting together a solution for a customer. Note that while the topic identification feeds into the offering mapping stage, the topics of a requirement do not necessarily provide a match to services in a given service catalog. The process described herein introduces a more accurate means (e.g., by introducing a new measure of similarity between requirements and service elements in the catalogs) and pervasive measures to identify the mapping to service offerings in a given service taxonomy and catalog. A requirement to offering mapping method is defined as: Let NP be a noun phrase in a requirement, and E be a catalog element from any given level of an offering taxonomy. A String_seq is used to denote the sequence of tokens resulting from tokenizing a string (as part of tokenization, all stop words are removed, words are converted to lower case, and the stem of each token is derived). Following this notation, NP_seq represents a sequence of a noun phrase, and E_seq denotes the sequence for a catalog element's name.

In a pre-processing step, catalog taxonomy is analyzed. The pre-processing includes processing each element at every level element to obtain an E_seq by tokenizing the string and filtering stop words. Then, each token is converted to lowercase and stemmed. Also, the frequency of each token in the catalog (at any level) is computed.

Process for matching noun phrases in requirements and offerings.

In an embodiment, matching noun phrases in requirements and offerings is performed. A noun phrase matcher is deployed, as a requirements-offering mapping, with two sequences (NP_seq and E_seq) from processed terms (corresponding to the NP and E to compare), and returns a similarity score between 0 and 1. The process is a modified Longest Common Sequence (LCS) term matcher. A challenge involving the LCS is finding the longest subsequence common to all sequences in a set of sequences (two in this case). The main difference of this matcher with other similarity metrics such Cosine and Jaccard is that the LCS preserves the order of tokens in matching, while others do not. For instance, "project management" and "management project" are equal according to Jaccard and Cosine, but for LCS they represent a 50% match.

An observation in the similarity computation of two noun phrases between requirements and offerings is that not all words weigh similarly in similarity measure contribution. For example, some words are common to many of the service elements (such as "management"), and therefore frequent, and so may not contribute to the same level in identifying similarities between noun phrases as is the case for less frequent, but unique words, such as "asset." For example, consider the phrases "asset management" and "quality management." While the two have the term "management" in common, they are not related. Therefore, in an embodiment, a weighting mechanism is defined as a coefficient in identifying the similarity scores between two phrases. In addition, an LCS score may be penalized if there are additional or missing tokens in the requirement phrase with the inference that the additional/missing tokens have a negative impact on the degree of matching of the two phrases. This penalization may be also performed in a weighted manner proportional to the frequency of each word in the catalog.

Let SE_Length denote the length of the E_seq being compared against a noun phrase. SE_Length is used as the denominator in computing the LCS score. This is because the noun phrases can vary in length and contain the exact term among other irrelevant terms. Indeed, a weighted version of the denominator is computed. If LCS is not empty and length of LCS<SE_Length, then it means that there are tokens from E_Seq not present in NP_Seq. To simply compute LCS/SE_Length, the resulting coefficient would be penalizing the missing tokens equally while there are words that are clearly more important than others. For instance, "management" is less important than "mainframe," as the latter is a more specific word in the context. Hence, if a common word is missing in NP_seq, it would be assigned a smaller weight proportional to its frequency. According to this weighting scheme, if the missing term is very specific, the penalization coefficient tends to be close to 1, and if the missing word is very generic, the penalization coefficient tends to be small (closer to 0). The base similarity metrics may be defined as: Based_Similarity_Score=#LCS/Weighted_Denominator, in which Weighted_Denominator is defined as the weighted sum of the number of missing words in the E_Seq.

In addition to considering the length of the two noun phrases and whether there are additional/missing terms, it also matters whether the matching terms are mentioned close by or whether there are terms in between that discount the quality of the match. To take this into account, a penalization is introduced for the distance between the matching terms. The objective is to penalize NP_Seq whose matching tokens are too far apart with respect to the E_Seq. For instance, for the following examples the base score would be 1, though Case B clearly refers to a different scope and should be reflected: A) <NP: "Storage management," E: "Storage Management">, and B) <NP: "storage systems/asset management," E: "Storage Management">

Let NetDistance be the net difference in tokens between the LCS in NP_Seq and E_Seq. For the previous two examples, the NetDistance for (A) is 0 and NetDistance for (B) is 2. In another example of E: "Storage XYZ ABC Management" and the same NP: "storage systems/asset management," and the LCS <Storage Management>, the resulting NetDistance is 0, as the two matching tokens are equally far apart in both cases. In this example, there is no extra penalization due to distance, but the score will be lower due to only two out of four tokens matched on E. Given the above, the final similarity score, Final_Similarity_Score=Based_Similarity_Score*(1−net_distance/C) is defined, in which C is a constant for the maximum length of noun phrases in the population.

Through the use of a configurable threshold, the list of candidate matching is filtered to those having a similarity score above the threshold.

Figure 4:
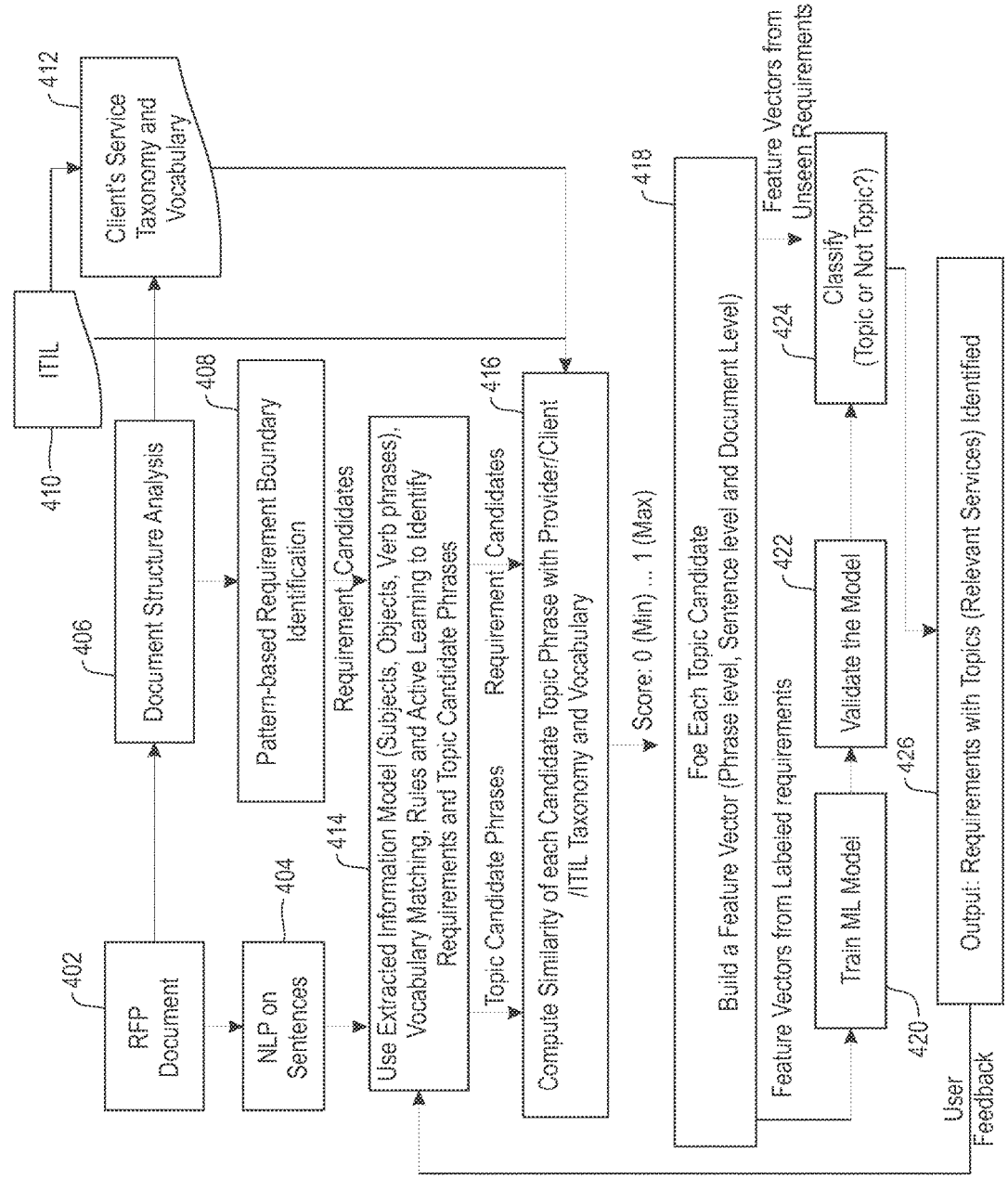
FIG. 4 depicts a flow diagram for requirement identification and requirement topics and focus identification in accordance with an embodiment.

Turning now to FIG. 4, a flow diagram for requirement identification and requirement topics and focus identification will now be described. At block 402, a RFP document is received, and natural language processing (NLP) is performed on sentences contained in the document at block 404. The NLP processing may be performed as described, e.g., in process 320 in FIG. 3. A document structure analysis is performed on the RFP document at block 406, which may be implemented as described, e.g., in FIG. 3 (process 310).

At block 408, pattern-based requirement boundary identification is performed. This identification can be implemented using techniques described in FIG. 3 (e.g., process 320 and process 330).

Requirement candidates are output from block 408. In block 414, extracted information (e.g., subjects, verb phrases, objects, etc.) from the model (model 200 of FIG. 2) is used in conjunction with vocabulary matching, rules and active learning to identify requirements and topic candidate phrases. This process can be implemented, e.g., using techniques described in process 330 of FIG. 3.

At block 416, the similarity of each candidate topic phrase compared with a provider and/or client taxonomy is computed. As shown in FIG. 4, a database 410 and database 412 may be accessed for this purpose. The similarity computation may be implemented using techniques described above in process 340 of FIG. 3. The similarity measure may be set as a value (e.g., score between 0 indicating minimal similarity to 1 indicating maximum similarity—i.e., exact match). This score is provided to the next block 418 in which a feature vector (e.g., phrase level, sentence level and document level) is built for each topic candidate. Feature vectors from labeled requirements can be used to train the model in block 420, which is then validated in block 422, while feature vectors from unknown requirements can be used in conjunction with the validation output (block 422) to classify the output as a topic or not in block 424. In block 426, requirements with topics determined to be relevant to the RFP document are identified. As shown in FIG. 4, user feedback from block 426 can be fed back to block 414 to learn the model.

Figure 5:
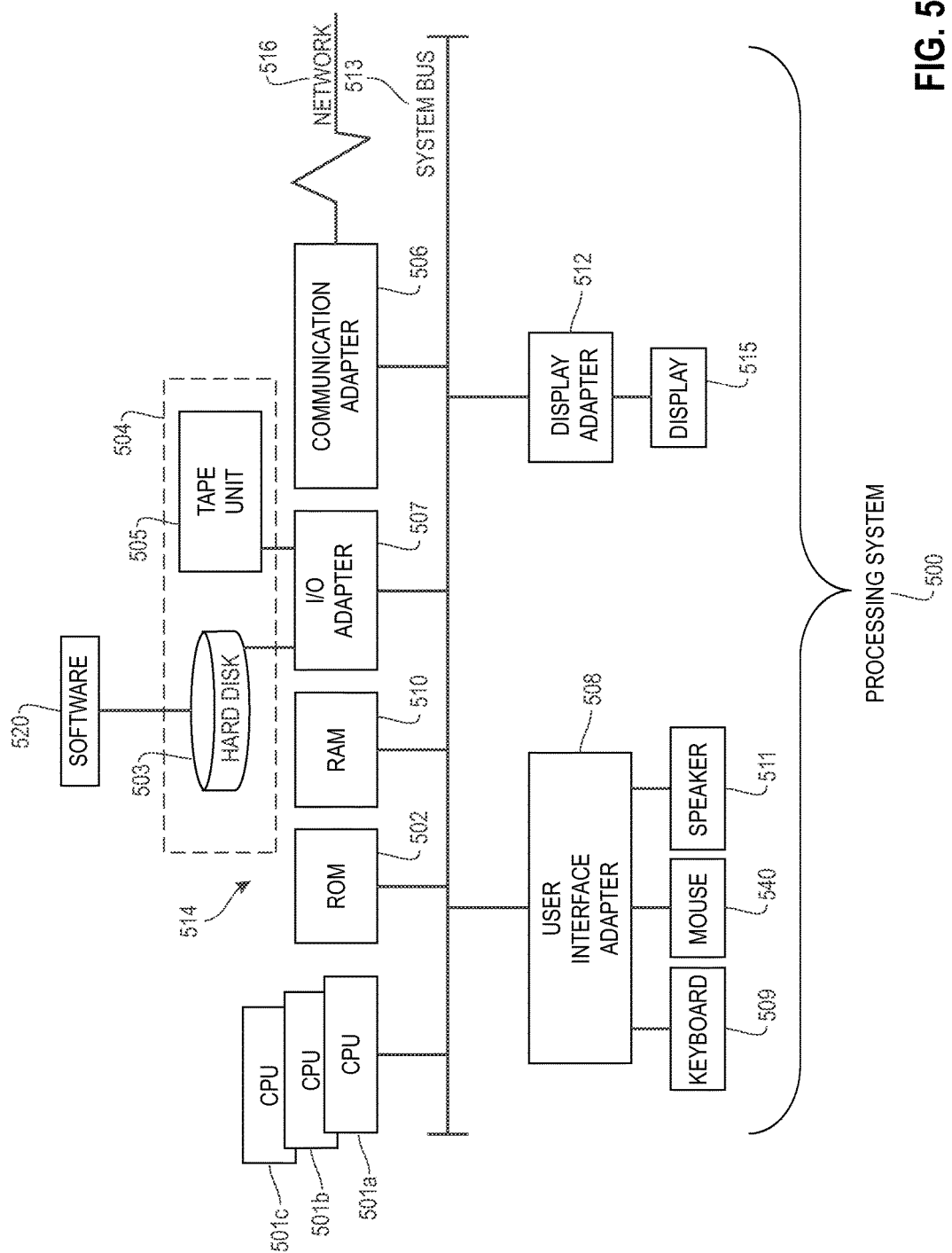
FIG. 5 depicts a processing system in accordance with an embodiment.

Referring now to FIG. 5, there is shown an embodiment of a processing system 500 for implementing the teachings herein. In this embodiment, the processing system 500 has one or more central processing units (processors) 501a, 501b, 501c, etc. (collectively or generically referred to as processor(s) 501). Processors 501, also referred to as processing circuits, are coupled to system memory 514 and various other components via a system bus 513. Read only memory (ROM) 502 is coupled to system bus 513 and may include a basic input/output system (BIOS), which controls certain basic functions of the processing system 500. The system memory 514 can include ROM 502 and random access memory (RAM) 510, which is read-write memory coupled to system bus 513 for use by processors 501.

FIG. 5 further depicts an input/output (I/O) adapter 507 and a communication adapter 506 coupled to the system bus 513. I/O adapter 507 may be a small computer system interface (SCSI) adapter that communicates with a hard disk 503 and/or tape storage drive 505 or any other similar component. I/O adapter 507, hard disk 503, and tape storage drive 505 are collectively referred to herein as mass storage 504. Software 520 for execution on processing system 500 may be stored in mass storage 504. The mass storage 504 is an example of a tangible storage medium readable by the processors 501, where the software 520 is stored as instructions for execution by the processors 501 to perform a method, such as the process flow of FIG. 4. Network adapter 506 interconnects system bus 513 with an outside network 516 enabling processing system 500 to communicate with other such systems. A screen (e.g., a display monitor) 515 is connected to system bus 513 by display adapter 512, which may include a graphics controller to improve the performance of graphics intensive applications and a video controller. In one embodiment, adapters 507, 506, and 512 may be connected to one or more I/O buses that are connected to system bus 513 via an intermediate bus bridge (not shown).

Suitable I/O buses for connecting peripheral devices such as hard disk controllers, network adapters, and graphics adapters typically include common protocols, such as the Peripheral Component Interconnect (PCI). Additional input/output devices are shown as connected to system bus 513 via user interface adapter 508 and display adapter 512. A keyboard 509, mouse 540, and speaker 511 can be interconnected to system bus 513 via user interface adapter 508, which may include, for example, a Super I/O chip integrating multiple device adapters into a single integrated circuit.

Thus, as configured in FIG. 5, processing system 500 includes processing capability in the form of processors 501, and, storage capability including system memory 514 and mass storage 504, input means such as keyboard 509 and mouse 540, and output capability including speaker 511 and display 515. In one embodiment, a portion of system memory 514 and mass storage 504 collectively store an operating system to coordinate the functions of the various components shown in FIG. 5.

Technical effects and benefits include the capability to generically model client requirements including key elements of a statement describing a client need and automatically identify requirements. The requirements identification takes into account linguistic features of statements in RFP documents, and also the context in which they are presented including the structure of the document, the section, paragraph, and adjacent text. The effects and benefits include the ability to learn a deeper model for requirement topic identification. Effects and benefits include a context-aware method for requirement-offering mapping (identifying a set of provider's service offerings that meet client requirements, the gaps—requirements that are not met by current offerings, and sets of offerings that could be relevant for the customer but are not matched directly to requirements in RFPs. Techniques consider not only the semantic and partial matching of phrases in requirements and service offering descriptions, but also the context which includes the surrounding text and the structure of RFP documents. An interactive tool allows users to explore the results in different views, provide feedback which is then taken into account by the tool to improve the learning model that guides the requirement identification, offering matching, and extraction for bidding processes.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of document-based requirement identification and extraction, comprising:
   receiving a requirements document comprising a set of documents;
   parsing, via a computer processor, the set of documents and identifying relationships among parsed components of the documents, wherein a relationship exists between parsed components that are cross-referenced in the set of documents;
   applying, via the computer processor, the parsed components and identified relationships to a meta-model that defines requirements, the requirements including at least one statement expressing at least one of a need and a responsibility;
   identifying candidate requirements and their candidate topics from results of the applying, the identifying comprising identifying a first starting location of a first identified candidate requirement and a second starting location of a second identified candidate requirement in a document in the set of documents, wherein contents of the document in the set of documents between the first starting location and the second starting location are considered related to the first identified candidate requirement;
   computing a similarity of each of the identified candidate topics to a standardized vocabulary;
   for each of the identified candidate topics, building a feature vector from the corresponding candidate requirements, wherein the feature vector comprises topics from the standardized vocabulary determined to be similar to the identified candidate topics;
   identifying, via the computer processor, a subset of the candidate requirements and corresponding topics expressed in the set of documents, the identifying a subset performed by a meta model previously trained using labeled feature vector, requirement pairs; and
   matching, via the computer processor, a candidate requirement in the subset of candidate requirements to a previously defined offering in a taxonomy or catalog.

2. The method of claim 1, wherein the identifying relationships among parsed components of the documents includes identifying relationships among the parsed components at varying levels within the set of documents, the levels including at least one of sentence level, paragraph level, section level, figures, and tables.

3. The method of claim 1, wherein the computing the similarity includes computing a confidence score for the identified candidate requirements indicating a strength of similarity, as a function of a measurable threshold value, between the identified candidate requirements and the topics from the standardized vocabulary;
   wherein the subset of the candidate requirements and corresponding topics are determined to have a confidence score that exceeds the measurable threshold value.

4. The method of claim 1, wherein the identifying candidate requirements further comprises identifying pattern-based requirement boundaries from the parsed components and the identified relationships.

5. The method of claim 1, wherein the set of documents is sourced from an entity seeking services from at least one other entity, the services indicated in the set of documents.

6. The method of claim 1, wherein the set of documents comprises a request for proposal.

7. A system for implementing document-based requirement identification and extraction, the system comprising:
   a memory having computer readable computer instructions; and a processor for executing the computer readable instructions, the computer readable instructions including:

receiving a requirements document comprising a set of documents;

parsing the set of documents and identifying relationships among parsed components of the documents, wherein a relationship exists between parsed components that are cross-referenced in the set of documents;

applying the parsed components and identified relationships to a meta-model that defines requirements, the requirements including at least one statement expressing at least one of a need and a responsibility;

identifying candidate requirements and their candidate topics from results of the applying, the identifying comprising identifying a first starting location of a first identified candidate requirement and a second starting location of a second identified candidate requirement in a document in the set of documents, wherein contents of the document in the set of documents between the first starting location and the second starting location are considered related to the first identified candidate requirement;

computing a similarity of each of the identified candidate topics to a standardized vocabulary;

for each of the identified candidate topics, building a feature vector from the corresponding candidate requirements, wherein the feature vector comprises topics from the standardized vocabulary determined to be similar to the identified candidate topics;

identifying a subset of the candidate requirements and corresponding topics expressed in the set of documents, the identifying a subset performed by a meta model previously trained using labeled feature vector, requirement pairs; and matching a candidate requirement in the subset of candidate requirements to a previously defined offering in a taxonomy or catalog.

8. The system of claim 7, wherein the identifying relationships among parsed components of the documents includes identifying relationships among the parsed components at varying levels within the set of documents, the levels including at least one of sentence level, paragraph level, section level, figures, and tables.

9. The system of claim 8, wherein the computing the similarity includes computing a confidence score for the identified candidate requirements indicating a strength of similarity, as a function of a measurable threshold value, between the identified candidate requirements and the topics from the standardized vocabulary;

wherein the subset of the candidate requirements and corresponding topics are determined to have a confidence score that exceeds the measurable threshold value.

10. The system of claim 7, wherein the identifying candidate requirements further comprises identifying pattern-based requirement boundaries from the parsed components and the identified relationships.

11. The system of claim 7, wherein the set of documents is sourced from an entity seeking services from at least one other entity, the services indicated in the set of documents.

12. The system of claim 7, wherein the set of documents comprises a request for proposal.

13. A computer program product comprising:

a tangible storage medium readable by a processor and storing instructions for execution by the processor to perform a method comprising:

receiving a requirements document comprising a set of documents;

parsing the set of documents and identifying relationships among parsed components of the documents, wherein a relationship exists between parsed components that are cross-referenced in the set of documents;

applying the parsed components and identified relationships to a meta-model that defines requirements, the requirements including at least one statement expressing at least one of a need and a responsibility;

identifying candidate requirements and their candidate topics from results of the applying, the identifying comprising identifying a first starting location of a first identified candidate requirement and a second starting location of a second identified candidate requirement in a document in the set of documents, wherein contents of the document in the set of documents between the first starting location and the second starting location are considered related to the first identified candidate requirement;

computing a similarity of each of the identified candidate topics to a standardized vocabulary;

for each of the identified candidate topics, building a feature vector from the corresponding candidate requirements, wherein the feature vector comprises topics from the standardized vocabulary determined to be similar to the identified candidate topics;

identifying a subset of the candidate requirements and corresponding topics expressed in the set of documents, the identifying a subset performed by a meta model previously trained using labeled feature vector, requirement pairs; and matching a candidate requirement in the subset of candidate requirements to a previously defined offering in a taxonomy or catalog.

14. The computer program product of claim 13, wherein the identifying relationships among parsed components of the documents includes identifying relationships among the parsed components at varying levels within the set of documents, the levels including at least one of sentence level, paragraph level, section level, figures, and tables.

15. The computer program product of claim 13, wherein the computing the similarity includes computing a confidence score for the identified candidate requirements indicating a strength of similarity, as a function of a measurable threshold value, between the identified candidate requirements and the topics from the standardized vocabulary;

wherein the subset of the candidate requirements and corresponding topics are determined to have a confidence score that exceeds the measurable threshold value.

16. The computer program product of claim 13, wherein the identifying candidate requirements further comprises identifying pattern-based requirement boundaries from the parsed components and the identified relationships.

17. The computer program product of claim 13, wherein the set of documents is sourced from an entity seeking services from at least one other entity, the services indicated in the set of documents, and wherein the set of documents comprises a request for proposal.

\* \* \* \* \*